(12) United States Patent
Taylor (10) Patent No.: US 12,005,864 B2
(45) Date of Patent: Jun. 11, 2024

(54) HITCH APPARATUS

(71) Applicant: Youngun's Welding Service LLC, Corpus Christi, TX (US)

(72) Inventor: Cody Taylor, Corpus Christi, TX (US)

(73) Assignee: Youngun's Weld ng Service LLC, Corpus Christi, TX (US)

(*) Notice: Subject to any disclaimer, the term of this patent is extended or adjusted under 35 U.S.C. 154(b) by 185 days.

(21) Appl. No.: 17/669,326

(22) Filed: Feb. 10, 2022

(65) Prior Publication Data
US 2023/0249627 A1 Aug. 10, 2023

(51) Int. Cl.
*B60R 9/06* (2006.01)
*B60D 1/06* (2006.01)
*B60D 1/54* (2006.01)
*B60D 1/52* (2006.01)

(52) U.S. Cl.
CPC ............ *B60R 9/06* (2013.01); *B60D 1/06* (2013.01); *B60D 1/54* (2013.01); *B60D 1/52* (2013.01); *B60D 2001/544* (2013.01)

(58) Field of Classification Search
CPC .... B60R 9/06; B60D 1/06; B60D 1/54; B60D 1/52; B60D 2001/544
USPC ........................................................ 224/496
See application file for complete search history.

(56) References Cited

U.S. PATENT DOCUMENTS

| | | | | |
|---|---|---|---|---|
| 3,460,695 A * | 8/1969 | Steele | ................. | B62D 43/04 414/466 |
| 4,524,475 A * | 6/1985 | Valentino | ............... | A61G 7/053 248/295.11 |
| 6,682,086 B1 * | 1/2004 | Erickson | ................. | B60R 3/02 280/166 |
| 6,712,381 B1 * | 3/2004 | Moss | ..................... | B60D 1/54 280/491.1 |
| 6,935,647 B2 * | 8/2005 | Knodle | ................... | B60R 3/02 280/166 |
| 7,316,339 B2 * | 1/2008 | Zhang | .................... | B60R 9/06 224/524 |
| 7,819,416 B2 * | 10/2010 | Moss | ..................... | B60D 1/07 280/491.1 |
| 8,469,385 B2 * | 6/2013 | Wergin | ................. | B60D 1/36 280/491.2 |
| 8,899,608 B2 * | 12/2014 | DeLisio | ................. | B60D 1/07 280/416.1 |
| 2012/0217724 A1 * | 8/2012 | Works | .................... | B60D 1/46 280/490.1 |

* cited by examiner

*Primary Examiner* — Adam J Waggenspack
(74) *Attorney, Agent, or Firm* — Quisenberry Law PLLC (57) ABSTRACT

A hitch apparatus is provided including a support assembly having an upper horizontal support member and a lower horizontal support member. The upper and lower support members may be spaced apart from and generally parallel to one another. The upper and lower horizontal support members are connected by a vertical support member that is secured to the upper support member and extends downwardly through the lower support member. The lower support member is adapted for rotatable movement relative to the upper support member between first and second positions. The upper support member is releasably engageable with a standard hitch receiver on the rear of a vehicle. The lower support may be connected to a cargo tray or other component, which may be releasably connected to the vertical support member and adapted for movement between a first position behind the vehicle and a second position beneath the rear of the vehicle.

20 Claims, 6 Drawing Sheets

HITCH APPARATUS

BACKGROUND OF THE INVENTIONS

1. Field of the Inventions

The present inventions generally pertain to devices for attachment to vehicles, and more particularly to devices for attachment to a hitch receiver on a vehicle, such as a cargo carrier.

2. Description Of The Related Art

It is standard for many vehicles, especially on pick-up trucks, to be sold with a trailer hitch mount or receiver at the rear of the vehicle as a standard feature of the vehicle. There are a variety of uses for a trailer hitch mount. The generally known purpose of a trailer hitch mount is to receive a hitch ball adapted for engagement with a trailer hitch tongue on a trailer to be towed behind the vehicle. Another known purpose for a trailer hitch mount is to receive and support various structures, such as cargo carriers that are adapted to engage with a trailer hitch mount. One of the shortcomings of existing structures, such as cargo carriers, that engage with a trailer hitch mount, is that the structure/cargo carrier is generally disconnected from the trailer hitch mount and stored when not in use.

As will become apparent from the description and explanation set forth below, the improved hitch devices of the present inventions may be rotated out of the way and stored beneath the rear of the vehicle when not in use, as opposed to disconnecting the hitch device and storing it separate and apart from the vehicle.

SUMMARY OF THE INVENTIONS

In one aspect, the present inventions may include an improved hitch apparatus comprising a support assembly having an upper elongated support member, a lower elongated support member, and a vertical support member, the upper and lower elongated support members being spaced apart from one another, an upper end of the vertical support member being secured to the upper elongated support member and extending downwardly away therefrom, and a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position. Another feature of this aspect of the present inventions may be that a first end of the lower elongated support member is adapted for releasable engagement with a first attachment, and a second end of the lower elongated support member is adapted for releasable engagement with a second attachment. Another feature of this aspect of the present inventions may be that the first attachment is a cargo tray, the upper elongated support member being engaged with a receiver on a vehicle, the cargo tray being positioned away from the vehicle when the lower elongated support member is in its first position, and the cargo tray being positioned beneath the vehicle when the lower elongated support member is in its second position. Another feature of this aspect of the present inventions may be that the lower end of the vertical support member extends through the lower elongated support member and includes a bearing surface that supports the lower elongated support member. Another feature of this aspect of the present inventions may be that the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position. Another feature of this aspect of the present inventions may be that the lower elongated support member includes a vertical bore therethrough, and the vertical support member is disposed within the vertical bore for rotational movement. Another feature of this aspect of the present inventions may be that the vertical bore is defined by a vertical sleeve that extends above the lower elongated support member. Another feature of this aspect of the present inventions may be that the vertical bore is defined by a vertical sleeve that extends below the lower elongated support member, a lower end of the vertical support member extends below a lower end of the vertical sleeve, and a bearing is disposed between the lower end of the vertical sleeve and a bearing surface on the lower end of the vertical support member.

In another aspect, the present inventions may include a hitch apparatus comprising: a support assembly having an upper elongated support member, a lower elongated support member, and a vertical support member, the upper and lower elongated support members being spaced apart from one another, an upper end of the vertical support member being secured to the upper elongated support member and extending downwardly away therefrom, a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position, and the lower end of the vertical support member extending through the lower elongated support member and including a bearing surface that supports the lower elongated support member. Another feature of this aspect of the present inventions may be that a first end of the lower elongated support member is adapted for releasable engagement with a first attachment, and a second end of the lower elongated support member is adapted for releasable engagement with a second attachment. Another feature of this aspect of the present inventions may be that the first attachment is a cargo tray, and the second attachment is a hitch ball, the upper elongated support member being engaged with a receiver on a vehicle, the cargo tray being positioned away from the vehicle and the hitch ball being positioned beneath the vehicle when the lower elongated support member is in its first position, and the cargo tray being positioned beneath the vehicle and the hitch ball being positioned away from the vehicle when the lower elongated support member is in its second position. Another feature of this aspect of the present inventions may be that the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position. Another feature of this aspect of the present inventions may be that the lower elongated support member includes a vertical bore therethrough, and the vertical support member is disposed within the vertical bore for rotational movement. Another feature of this aspect of the present inventions may be that the vertical bore is defined by a vertical sleeve that extends above the lower elongated support member. Another feature of this aspect of the present inventions may be that the vertical bore is defined by a vertical sleeve that extends below the lower elongated support member, a lower end of the vertical support member extends below a lower end of the vertical sleeve, and a bearing is disposed between the lower end of the vertical sleeve and a bearing surface on the lower end of the vertical support member.

In yet another aspect, the present inventions may include a hitch apparatus comprising: a support assembly having an upper elongated support member, a lower elongated support member, and a vertical support member, the upper and lower elongated support members being spaced apart from one another, an upper end of the vertical support member being secured to the upper elongated support member and extending downwardly away therefrom, a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position, the lower end of the vertical support member extending through the lower elongated support member and including a bearing surface that supports the lower elongated support member, and the lower elongated support member including a vertical bore therethrough defined by a vertical sleeve, and the vertical support member being disposed within the vertical bore for rotational movement. Another feature of this aspect of the present inventions may be that a first end of the lower elongated support member is adapted for releasable engagement with a first attachment, and a second end of the lower elongated support member is adapted for releasable engagement with a second attachment. Another feature of this aspect of the present inventions may be that the first attachment is a cargo tray, and the second attachment is a hitch ball, the upper elongated support member being engaged with a receiver on a vehicle, the cargo tray being positioned away from the vehicle and the hitch ball being positioned beneath the vehicle when the lower elongated support member is in its first position, and the cargo tray being positioned beneath the vehicle and the hitch ball being positioned away from the vehicle when the lower elongated support member is in its second position.

Another feature of this aspect of the present inventions may be that the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position. Another feature of this aspect of the present inventions may be that a lower end of the vertical support member extends below a lower end of the vertical sleeve, and a bearing is disposed between the lower end of the vertical sleeve and a bearing surface on the lower end of the vertical support member.

Other features, aspects and advantages of the present inventions will become apparent from the following discussion and detailed description.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
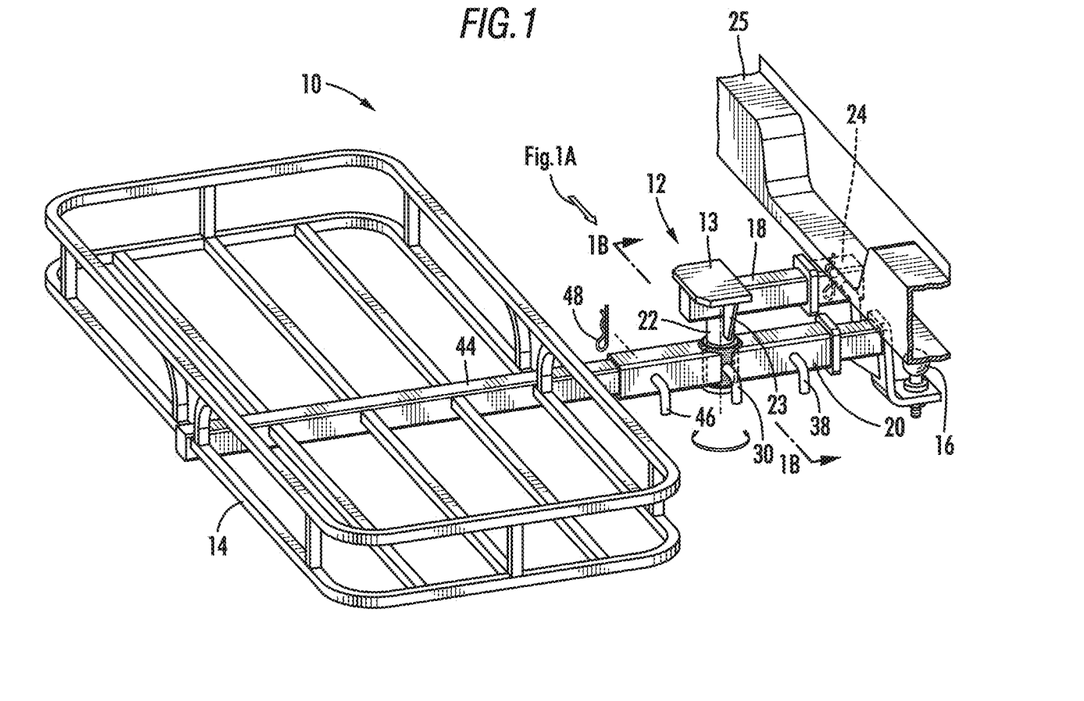
FIG. 1 is a perspective view of a specific embodiment of a trailer hitch apparatus constructed in accordance with one aspect of the present inventions.

Referring to the drawings in detail, wherein like numerals denote identical elements throughout the several views, and referring initially to FIG. 1, there is shown a specific embodiment of a hitch apparatus 10 including a support assembly 12 releasably connected to a cargo tray 14 on one end and a ball hitch 16 on an opposite end. The cargo tray 14 may include an elongated cargo tray support member 44 (such as made from square metal tubing) adapted for releasable engagement with the support assembly 12, as more fully discussed below. The cargo tray 14 may also include a slide out tray for storing various items, such as tools. The support assembly 12 may include an upper elongated support member 18, a lower elongated support member 20, and a vertical support member 22. In a specific embodiment, the support assembly 12 may include a step plate 13 attached to an upper surface of the upper elongated support member 18. In a specific embodiment, the upper elongated support member 18 may be a section of square steel tubing sized for slidable engagement within a standard hitch receiver 24 of the type that is standard equipment on many new vehicles, especially including pick-up trucks. The hitch receiver 24 may be mounted below a rear bumper 25. In a specific embodiment, the lower elongated support member 20 may also be constructed of square steel tubing, but of a larger size that may receive a section of square tubing that is the same size as the upper elongated support member 18. In a specific embodiment, the upper elongated support member 18 and the lower elongated support member 20 may be disposed in generally parallel relationship to one another.

The vertical support member 22 may be secured, such as by welding, to the upper elongated support member 18 and extend downwardly away therefrom in generally perpendicular relationship to the upper elongated support member 18. One or more gussets 23 may be provided for additional structure support for the vertical support member 22. In a specific embodiment, the vertical support member 22 may be constructed from a section of round steel tubing, such as a section of 1.5-inch steel pipe, for example. The lower elongated support member 20 may include a vertical bore 26. In a specific embodiment, the vertical bore 26 may be defined by a section of round steel tubing 27, such as a section of two-inch steel pipe. The lower elongated support member 20 may also include a transverse bore 21, such as through the center of the vertical bore 26. The vertical support member 22 may be disposed for rotatable movement through the vertical bore 26. A retaining member 28, such as a retaining ring or a flat plate, may be secured to a lower end of the vertical support member 22 to support the lower elongated support member 20 and provide a bearing surface on which the lower elongated support member 20 may rotate, such as indicated by the arrows in FIG. 1A. A lower end of the vertical support member 22 is provided with a transverse bore 29 adapted for alignment with the transverse bore 21 through the lower elongated support member 20. A first pin 30 may be removably inserted through the aligned transverse bores 21 and 29 to prevent or permit rotation of the lower elongated support member 20 relative to the vertical support member 22. The first pin 30 may be secured with a first cotter pin 32.

Figure 1A:
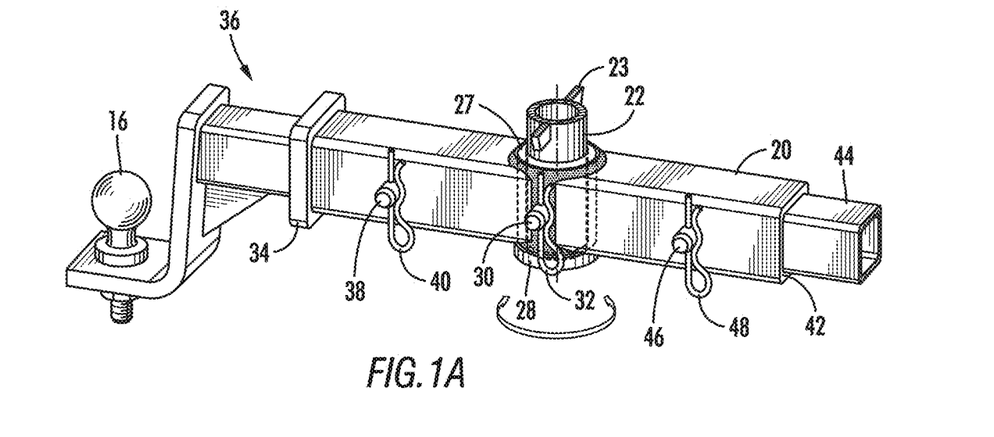
FIG. 1A is a perspective view of a portion of the trailer hitch apparatus shown in FIG. 1 taken from the direction as indicated in FIG. 1.

With reference to FIG. 1A, a first end 34 of the lower elongated support member 20 may removably receive a ball hitch assembly 36 including the ball hitch 16. The ball hitch assembly 36 may be secured in place with a second pin 38 and a second cotter pin 40 in a known manner. A second end 42 of the lower elongated support member 20 may removably receive the cargo tray support 44. The cargo tray support 44 may be a section of square tubing of the same size as the upper elongated support member 18. The cargo tray support 44 may be secured in place with a third pin 46 and a third cotter pin 48 in the same manner as with the other pins 30 and 38.

Figure 2:
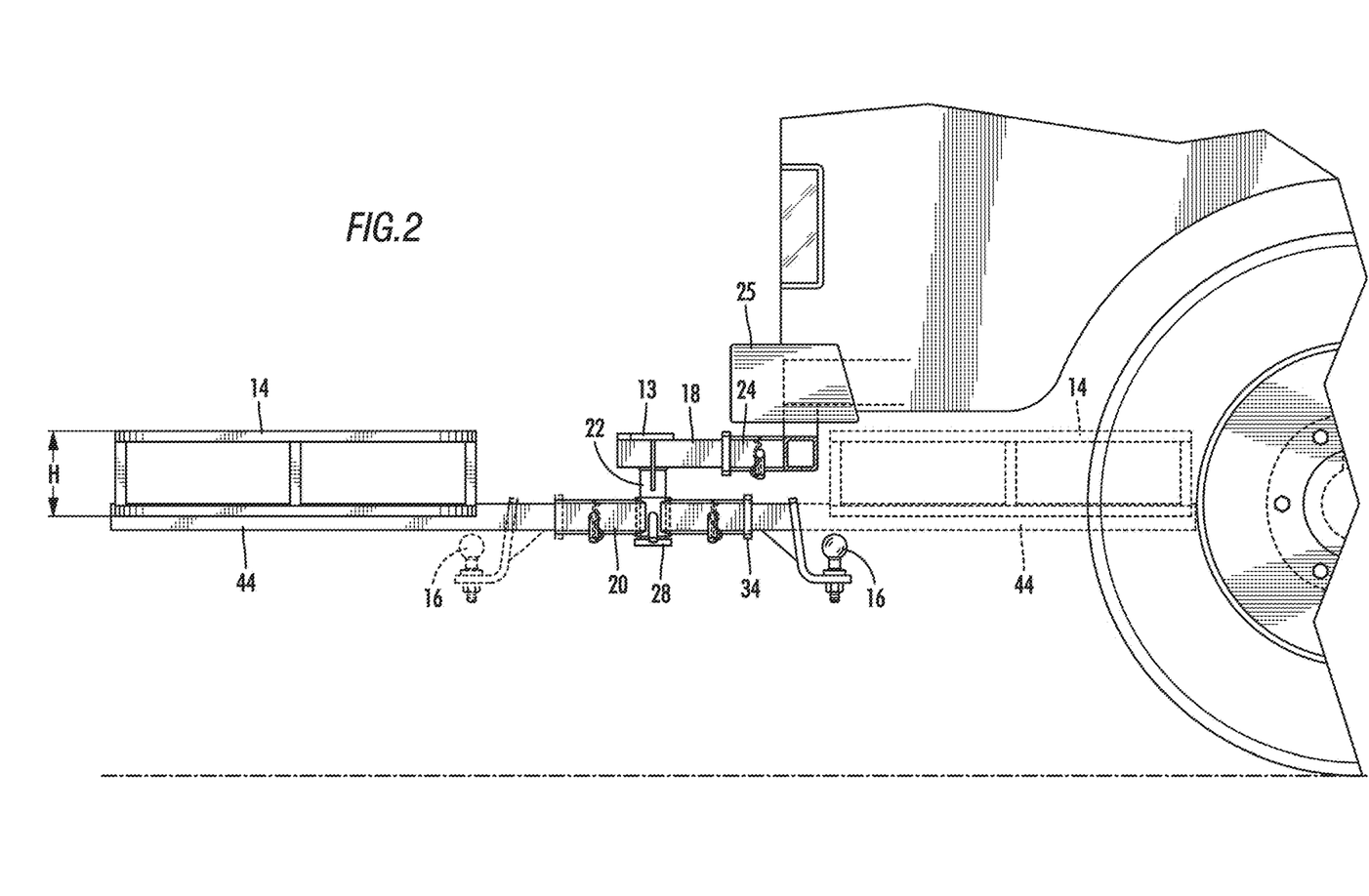
FIG. 2 is a side view of the trailer hitch apparatus as shown in FIG. 1.
Figure 3:
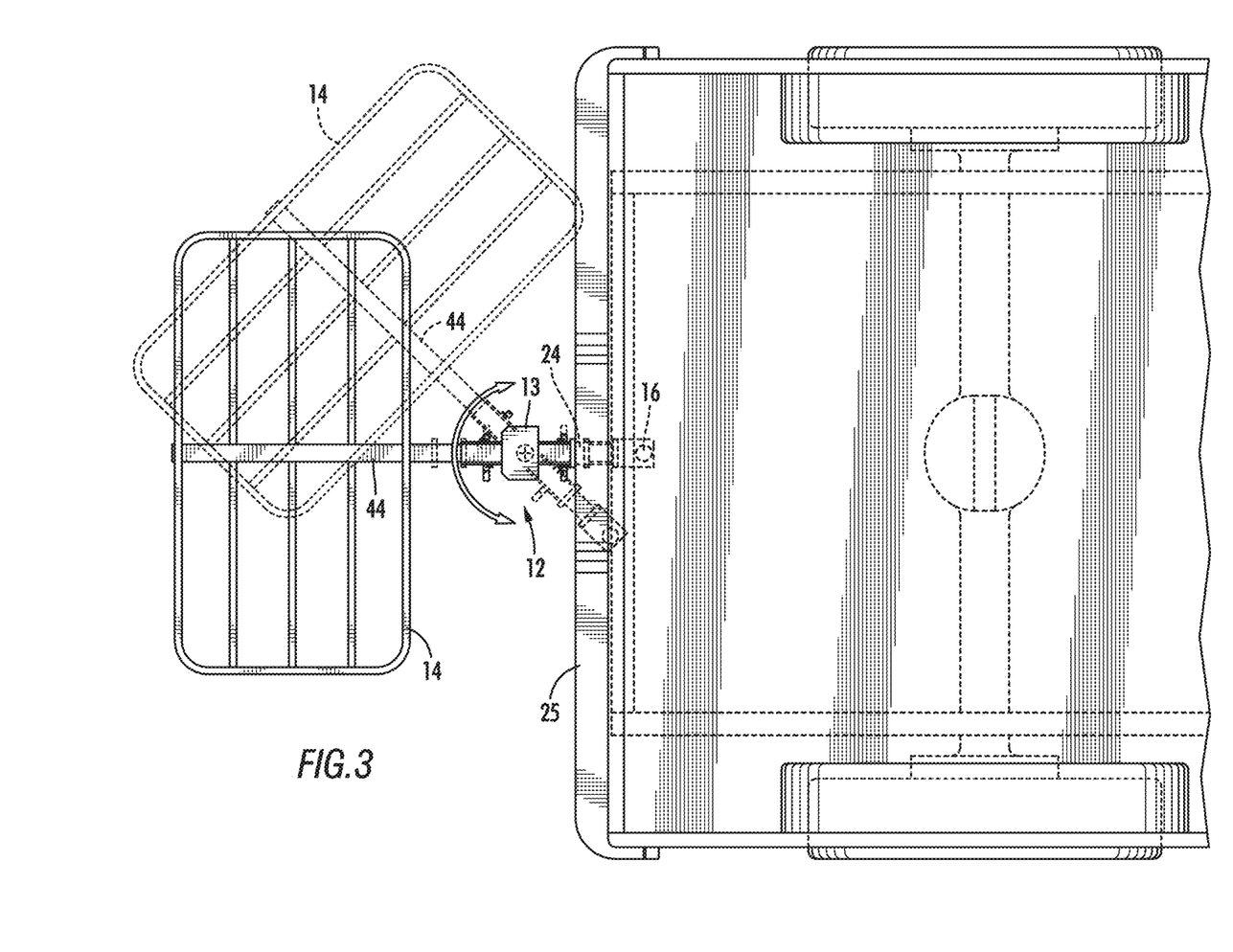
FIG. 3 is a top view of the trailer hitch apparatus as shown in FIG. 1 and in the process of being rotated from a first position to a second position.
Figure 4:
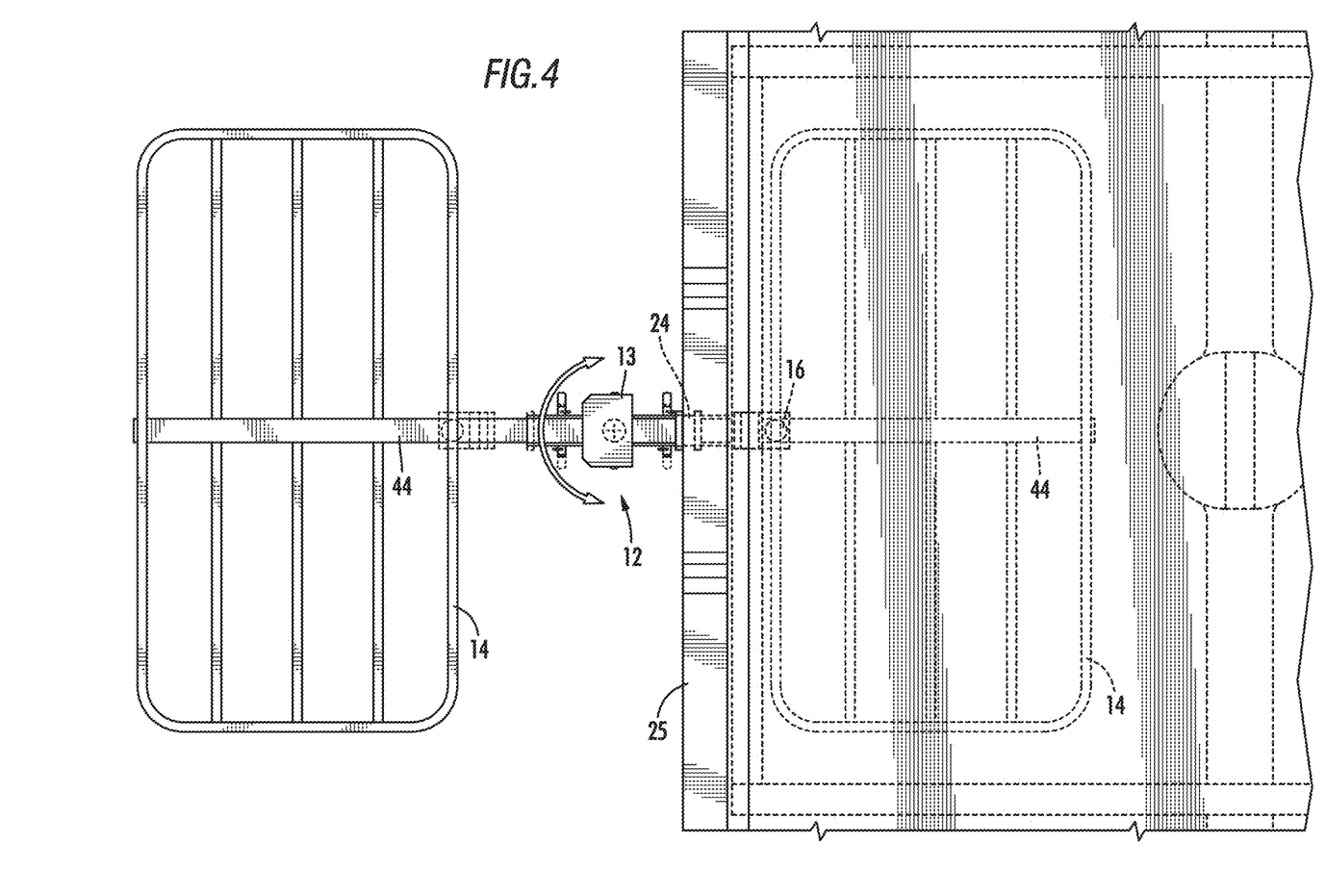
FIG. 4 is a top view similar to FIG. 3 but showing the trailer hitch apparatus from FIG. 1 in its second position in dashed lines with a cargo rack positioned beneath a rear end of a vehicle to which the apparatus is attached.

With reference to FIG. 4, the cargo tray 14 is shown in a first or rearward position, in which it can be used to carry various items of cargo. When the cargo tray 14 is no longer needed for use, it can be rotated out of sight and beneath the vehicle to a second or forward position, as shown in dashed lines in FIGS. 2 and 4. To rotate the cargo tray 14 to its second position, the first pin 30 is removed to allow rotational movement of the lower elongated support member 20 relative to the upper elongated support member 18. With reference to FIG. 3, once the first pin 30 is removed, the cargo tray 14 can then be rotated, such as to move the cargo tray 14 from its first position towards its second position. The cargo tray 14 is provided with dimensions that will allow for clearance from striking any part of the vehicle when rotating it between its first and second positions. In a specific embodiment, the cargo tray 14 may be approximately forty inches long and twenty inches wide. In a specific embodiment, with reference to FIG. 2, the height H of the cargo tray 14 may be approximately two to four inches.

Figures 1B, 1C, 5:
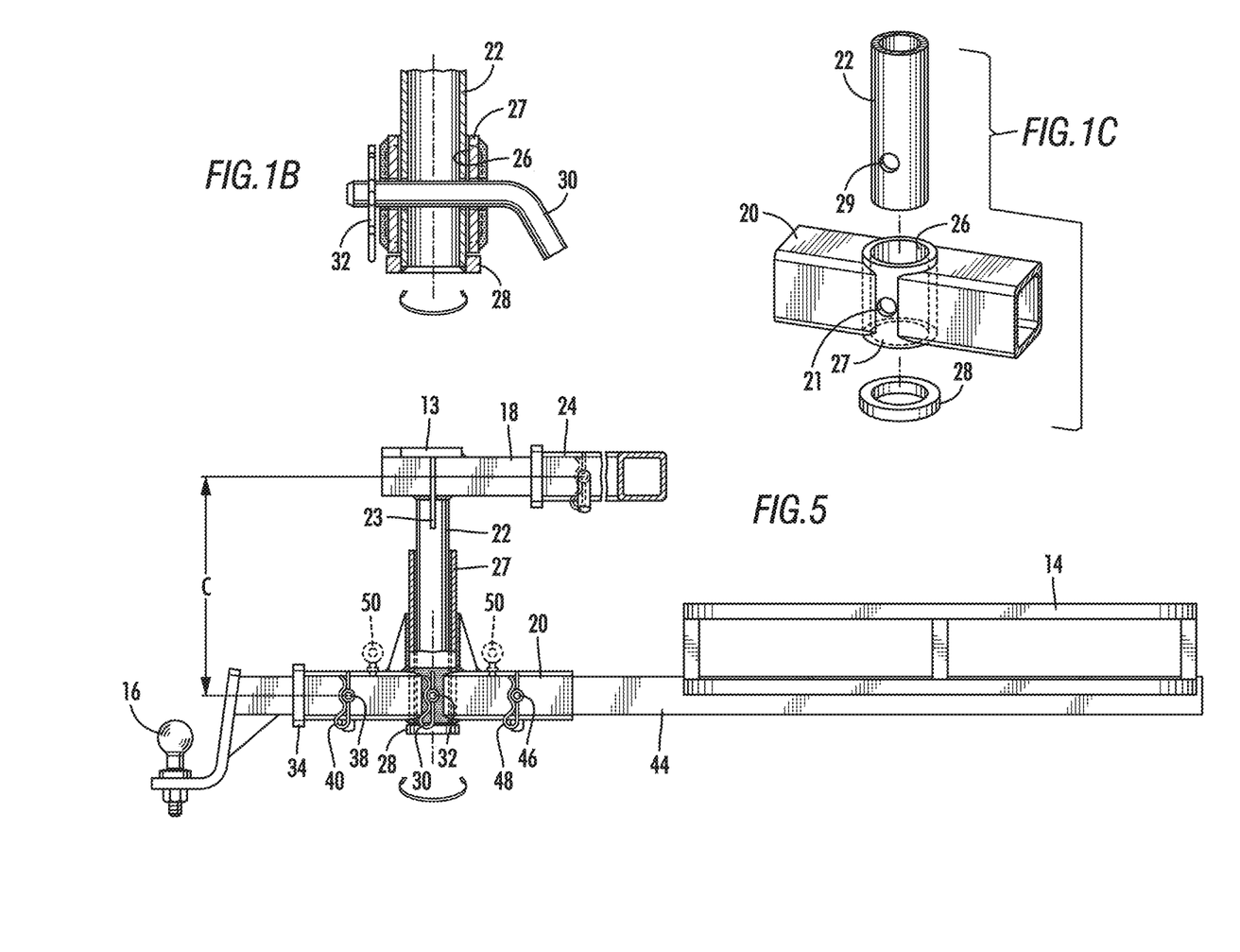
FIG. 1B is cross sectional view taken along line 1B-1B in FIG. 1.
FIG. 1C is an exploded view of a portion of the trailer hitch apparatus shown in FIG. 1.
FIG. 5 is a side view of the trailer hitch apparatus as shown in FIG. 1 but not connected to a vehicle.

Referring now to FIG. 5, in another specific embodiment, the pipe 27 may extend upwardly above the lower elongated support member 20 to provide additional structural support for the vertical support member 22. In a specific embodiment, a transverse adjusting pin (not shown) may be provided for removably engagement with transverse bores through the vertical support member 22 and the pipe 27 between the lower elongated support member 20 and the upper elongated support member 18 to allow for adjustment of a distance C between the upper and lower elongated support members 18 and 20. This may be desired depending on the particular configuration and design of a vehicle to which a device of the present inventions is engaged. In a specific embodiment, the distance C may be in the range of four to five inches. In another specific embodiment, one or more loop members 50 may be provided on top of the lower elongated support member 22 for purposes of lifting or lowering the lower elongated support member 22 relative to the upper elongated support member 18 if the distance between them is being adjusted.

Figure 6:
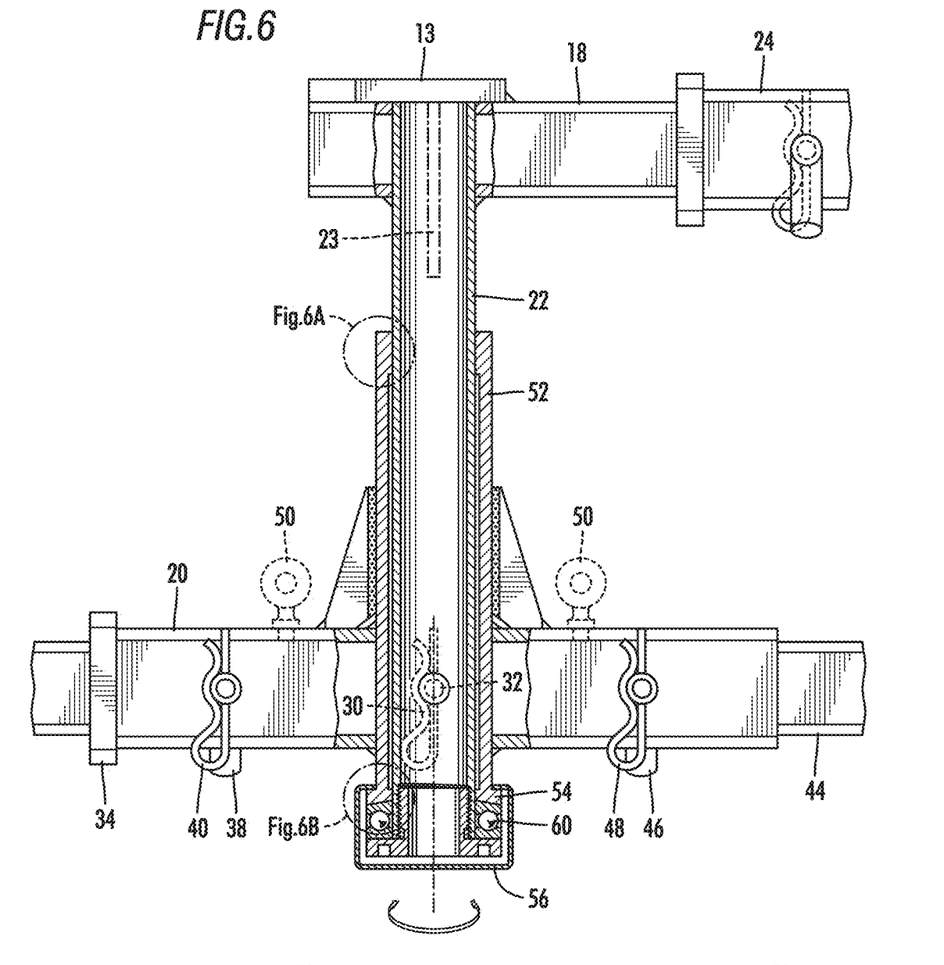
FIG. 6 is a side view in partial cross section of a portion of the hitch apparatus as shown in FIG. 1.
Figure 6A:
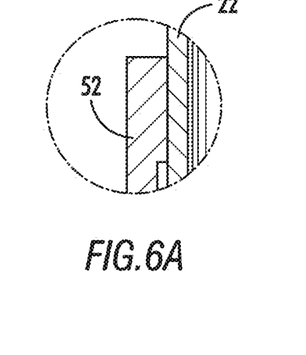
FIG. 6A is a detailed view of a portion of the hitch apparatus shown in FIG. 6.
Figure 6B:
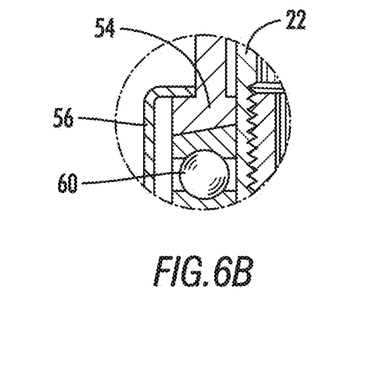
FIG. 6B is a detailed view of a portion of the hitch apparatus shown in FIG. 6.

Referring now to FIGS. 6, 6A, and 6B, in another specific embodiment, instead of the pipe 27 as shown in FIG. 1C, the apparatus may be provided with a vertical sleeve 52 that may extend above and below the lower elongated support member 20, and secured thereto, such as by welding. A lower end 54 of the vertical sleeve 52 may be connected to a housing 56. A lower end of the vertical support member 22 may extend downwardly within the vertical sleeve 52 and then below the lower end 54 of the vertical sleeve 52. A retaining nut or T-member 58 may be threadably attached or welded to the lower end of the vertical support member 22 with a bearing 60 disposed and retained between the nut/T-member 58 and the lower end 54 of the vertical sleeve 52. In a specific embodiment, the bearing 60 may be a tapered thrust bearing, such as ball or roller bearing. The bearing 60 may aid in alignment and ease of use of the apparatus of the present inventions. The bearing 60 may be permanently fixed to a base plate, such as the nut/T-member 58, and may allow the outer vertical pipe sleeve 52 to rest on top of the bearing 60 and permanently fixed to the outer pipe sleeve 52. In this manner, friction upon rotation of the lower elongated support member 20 relative to the upper elongated support member 18 may be reduced in comparison to the embodiments described above. The use of a bearing 60 in this embodiment may also have the added benefit of reducing slop or wiggle between the vertical support member 22 and the vertical outer sleeve member 52. In another specific embodiment, another bearing 60 may be attached above the lower elongated support member 20 to an upper end of the outer sleeve member 52 and the vertical support member 22, such as around the section corresponding to FIG. 6A. In a specific embodiment, tongue weight or cargo weight when in use may be supported by a ⅝-inch tow pin of the type already in the market.

As discussed above, cargo racks adapted for releasable engagement with a standard hitch receiver 24 is known. Those cargo racks, however, are stored away from the vehicle, such as in a garage or shed, when not in use. Then, when the cargo rack is needed, it must be retrieved from storage and engaged with the hitch receiver 24. With the present inventions, however, the cargo tray 14 can always be on board the vehicle. But the cargo tray 14 is not always in its rearward position where it can be used for hauling items such as a cooler. Instead, with the present inventions, when the cargo tray 14 is not needed for use in its rearward position, it is rotated to its forward position underneath the vehicle, where it is generally out of sight and not readily visible. When in this forward position, the hitch ball 16 is in a rearward position where it is available for use to engage with a trailer, for example. When need for the cargo tray 14 arises, it can quickly be rotated to its rearward position for use, as shown for example in FIG. 4. The hitch systems of the present inventions may be sold as an aftermarket product or provided as an option or even a standard feature with new vehicles.

It is further noted that the present inventions are not limited to the use of cargo trays, such as cargo tray 14, with the present inventions. For example, instead of a cargo tray 14, other components such as a step or other receiver attachment may be used as part of or in combination with the present inventions. By spinning the cargo rack, step, or other attachment under the vehicle while maintaining the opposite facing receiver, such as for the ball hitch 16, constant availability and ready instant access of many attachments and options such as to pull a trailer is always available without retrieving attachments from storage. Also, the ability to rotate an attachment such as the cargo tray 14 out of sight beneath the vehicle eliminates back-up camera and bumper sensor alerts. This also results in a better appearance and cleaner look around the vehicle when cargo capacity is not needed.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. An apparatus comprising:
a support assembly having an upper elongated support member, a lower elongated support member, and a vertical support member,
the upper and lower elongated support members being spaced apart from one another,
the lower elongated support member having a first socket opening at a first end of the lower elongated support member and a second socket opening at a second end of the lower elongated support member,
an upper end of the vertical support member being secured to the upper elongated support member and extending downwardly away therefrom, and
a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position.

2. The apparatus of claim 1, further including a first attachment and a second attachment, the first attachment being releasably attachable within the first socket opening.

3. The apparatus of claim 2, wherein the first attachment is a cargo tray, the upper elongated support member being engaged with a receiver on a vehicle, the cargo tray being positioned away from the vehicle when the lower elongated support member is in its first position, and the cargo tray being positioned beneath the vehicle when the lower elongated support member is in its second position.

4. The apparatus of claim 1, wherein the lower end of the vertical support member extends through the lower elongated support member and includes a bearing surface that supports the lower elongated support member.

5. The apparatus of claim 1, wherein the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position.

6. The apparatus of claim 1, wherein the lower elongated support member includes a vertical bore therethrough, and the vertical support member is disposed within the vertical bore for rotational movement.

7. The apparatus of claim 6, a vertical sleeve that is aligned with the vertical bore and that extends above the lower elongated support member.

8. The apparatus of claim 6, wherein the vertical bore is defined by a vertical sleeve that extends below the lower elongated support member, a lower end of the vertical support member extends below a lower end of the vertical sleeve, and a bearing is disposed between the lower end of the vertical sleeve and a bearing surface on the lower end of the vertical support member.

9. An apparatus comprising:
a support assembly having an upper elongated support member, a lower elongated support member, and a vertical support member,
the upper and lower elongated support members being spaced apart from one another, the lower elongated support member having a first socket opening at a first end of the lower elongated support member and a second socket opening at a second end of the lower elongated support member, an upper end of the vertical support member being secured to the upper elongated support member and extending downwardly away therefrom, a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position, and the lower end of the vertical support member extending through the lower elongated support member and including a bearing surface that supports the lower elongated support member.

10. The apparatus of claim 9, further including a first attachment and a second attachment, the first attachment being releasably attachable within the first socket opening, and the second attachment being releasably attachable within the second socket opening.

11. The apparatus of claim 10, wherein the first attachment is a cargo tray, and the second attachment is a hitch ball, the upper elongated support member being engaged with a receiver on a vehicle, the cargo tray being positioned away from the vehicle and the hitch ball being positioned beneath the vehicle when the lower elongated support member is in its first position, and the cargo tray being positioned beneath the vehicle and the hitch ball being positioned away from the vehicle when the lower elongated support member is in its second position.

12. The apparatus of claim 9, wherein the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position.

13. The apparatus of claim 9, wherein the lower elongated support member includes a vertical bore therethrough, and the vertical support member is disposed within the vertical bore for rotational movement.

14. The apparatus of claim 13, a vertical sleeve that is aligned with the vertical bore and that extends above the lower elongated support member.

15. The apparatus of claim 13, wherein the vertical bore is defined by a vertical sleeve that extends below the lower elongated support member, a lower end of the vertical support member extends below a lower end of the vertical sleeve, and a bearing is disposed between the lower end of the vertical sleeve and a bearing surface on the lower end of the vertical support member.

16. An apparatus comprising:
a support assembly having an upper elongated support member, a lower elongated support member, and a vertical support member, the upper and lower elongated support members being spaced apart from one another, the lower elongated support member having a first socket opening at a first end of the lower elongated support member and a second socket opening at a second end of the lower elongated support member, an upper end of the vertical support member being secured to the upper elongated support member and extending downwardly away therefrom, a lower end of the vertical support member supporting the lower elongated support member, the lower elongated support member being adapted for rotatable movement relative to the vertical support member and the upper elongated support member, the lower elongated support member being adapted for releasable engagement with the vertical support member, the lower elongated support member being moveable between a first position and a second position, the first and second positions between opposite one another, the upper and lower elongated support members being disposed in generally parallel relationship to one another when the lower elongated support member is in its first position and when it is in its second position, the lower end of the vertical support member extending through the lower elongated support member and including a bearing surface that supports the lower elongated support member, and the lower elongated support member including a vertical bore therethrough defined by a vertical sleeve, and the vertical support member being disposed within the vertical bore for rotational movement.

17. The apparatus of claim 16, further including a first attachment and a second attachment, the first attachment being releasably attachable within the first socket opening, and the second attachment being releasably attachable within the second socket opening.

18. The apparatus of claim 17, wherein the first attachment is a cargo tray, and the second attachment is a hitch ball, the upper elongated support member being engaged with a receiver on a vehicle, the cargo tray being positioned away from the vehicle and the hitch ball being positioned beneath the vehicle when the lower elongated support member is in its first position, and the cargo tray being positioned beneath the vehicle and the hitch ball being positioned away from the vehicle when the lower elongated support member is in its second position.

19. The apparatus of claim 16, wherein the lower end of the vertical support member includes a first transverse bore, and the lower elongated support member includes a second transverse bore, the first and second transverse bores being adapted for alignment to receive a removable pin to prevent rotation of the lower elongated support member relative to the vertical support member when the lower elongated support member is in its first position and when the lower elongated support member is in its second position.

20. The apparatus of claim 16, wherein a lower end of the vertical support member extends below a lower end of the vertical sleeve, and a bearing is disposed between the lower end of the vertical sleeve and a bearing surface on the lower end of the vertical support member.

\* \* \* \* \*